(12) United States Patent
Bokobza et al.

(10) Patent No.: US 12,056,620 B2
(45) Date of Patent: Aug. 6, 2024

(54) SYSTEM AND METHOD FOR IDENTIFYING AND RESOLVING PERFORMANCE ISSUES OF AUTOMATED COMPONENTS

(71) Applicant: Microsoft Technology Licensing, LLC, Redmond, WA (US)

(72) Inventors: Yasmin Bokobza, Ramat Gan (IL); Kiran Rama, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 126 days.

(21) Appl. No.: 17/706,712

(22) Filed: Mar. 29, 2022

(65) Prior Publication Data

US 2023/0316099 A1 Oct. 5, 2023

(51) Int. Cl.
*G06N 5/022* (2023.01)
*G06F 16/2457* (2019.01)
(Continued)

(52) U.S. Cl.
CPC ........ *G06N 5/022* (2013.01); *G06F 16/24578* (2019.01); *G06F 16/285* (2019.01); *G06N 5/01* (2023.01)

(58) Field of Classification Search
CPC ............ G06N 5/022; G06N 5/01; G06N 5/04; G06N 20/20; G06F 16/24578; G06F 16/285
See application file for complete search history.

(56) References Cited

U.S. PATENT DOCUMENTS 10,505,825 B1 * 12/2019 Bettaiah ................ G06F 16/285
2008/0256230 A1 * 10/2008 Handley ............... H04L 63/145
709/224

(Continued)

FOREIGN PATENT DOCUMENTS

WO   WO-2008022341 A2 *  2/2008   ......... G06F 18/2321
WO   WO-2021042844 A1 *  3/2021

OTHER PUBLICATIONS

M., et al., "Efficient Resource Allocation in Cloud Environment", In International Journal of Engineering Research & Technology, Apr. 24, 2018, 5 Pages.
(Continued)

*Primary Examiner* — Apu M Mofiz
*Assistant Examiner* — Oscar Wehovz
(74) *Attorney, Agent, or Firm* — Weaver IP L.L.C.

(57) ABSTRACT

Systems and methods are described for identifying and resolving performance issues of automated components. The automated components are segmented into groups by applying a K-means clustering algorithm thereto based on segmentation feature values respectively associated therewith, wherein an initial set of centroids for the K-means clustering algorithm is selected by applying a set of context rules to the automated components. Then, for each group, a performance ranking is generated based at least on a set of performance feature values associated with each of the automated components in the group and a feature importance value for each of the performance features. The feature importance values are determined by training a machine learning based classification model to classify automated components into each of the groups, wherein the training is performed based on the respective performance feature values of the automated components and the respective groups to which they were assigned.

20 Claims, 7 Drawing Sheets

(51) Int. Cl.
*G06F 16/28* (2019.01)
*G06N 5/01* (2023.01)

(56) References Cited

U.S. PATENT DOCUMENTS

2019/0325344 A1* 10/2019 Chen .................. G06N 7/01
2020/0089761 A1* 3/2020 Guerra ................ G06F 40/30
2020/0344252 A1* 10/2020 Menon ............. G06F 11/3006
2021/0035026 A1* 2/2021 Bansal ............. G06F 11/3006

OTHER PUBLICATIONS

Vouros, et al., "An empirical comparison between stochastic and deterministic centroid initialisation for K-means variations", In Journal of Machine Learning, vol. 110, Jul. 12, 2021, pp. 1975-2003.

"International Search Report and Written Opinion Issued in PCT Application No. PCT/US2022/054304", dated Apr. 13, 2023, 15 Pages.

* cited by examiner

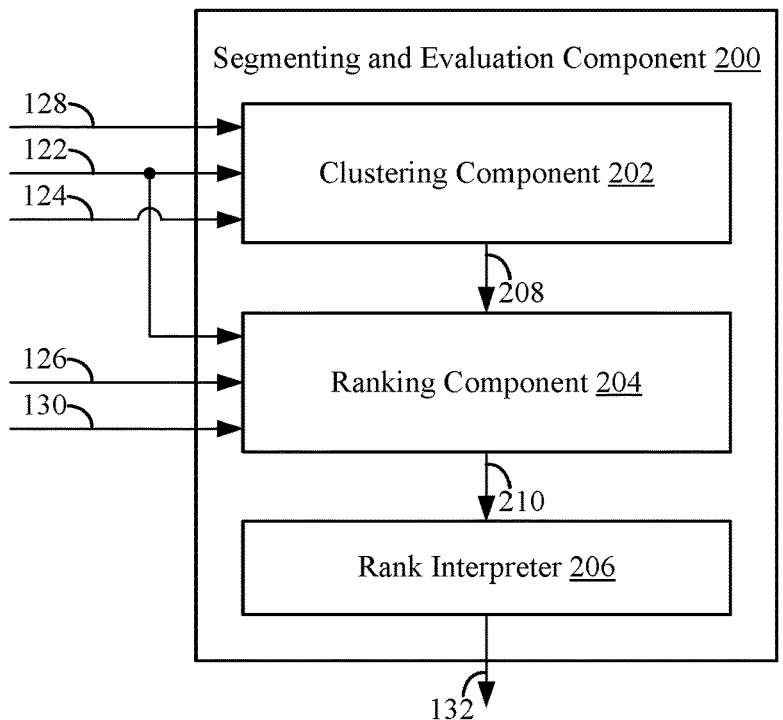

302 For each of a plurality of automated components, receive a respective set of segmentation feature values and a respective set of performance feature values 304 Segment the plurality of automated components into groups by applying a clustering algorithm to the plurality of automated components based on the segmentation feature values respectively associated therewith 306 For each group of automated components, generate a ranking of the automated components of the group based at least on the set of performance feature values respectively associated therewith 308 Perform an action based on the rank of at least one of the automated components.

| 702 | Determine a feature importance value for each of the performance features by training a machine learning based classification model that predicts a particular one of the groups based on the performance feature values of the automated components |

| 704 | For each of the automated component, calculate a performance score for the automated component based on performance feature values of the automated component and the feature importance values of each of the performance features |

| 706 | For each group of automated components, generate a ranking of the automated components of the group based on the respective performance scores |

FIG. 7

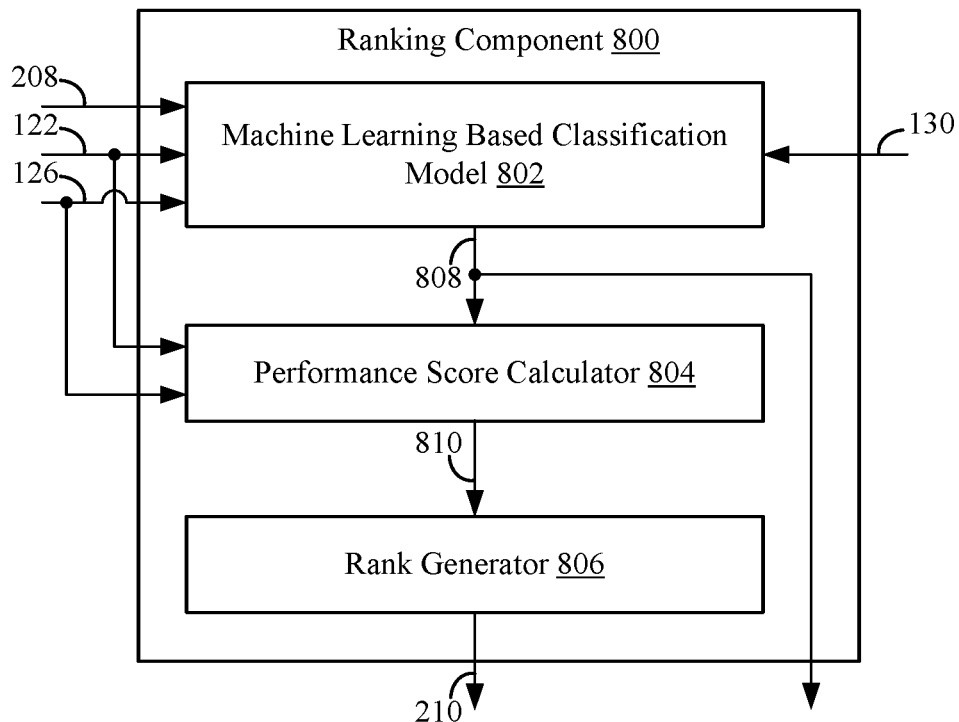

FIG. 8

SYSTEM AND METHOD FOR IDENTIFYING AND RESOLVING PERFORMANCE ISSUES OF AUTOMATED COMPONENTS

BACKGROUND

In many applications, it may be deemed desirable to monitor the performance of an automated component so that performance issues associated therewith may be identified and resolved. For instance, it may be deemed desirable to monitor and evaluate the performance of an automated component with respect to other components within a cohort to help identify performance issues therewith.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for identifying and resolving performance issues of automated components. In one implementation, for each of a plurality of automated components, a respective set of segmentation feature values corresponding to a set of segmentation features and a respective set of performance feature values corresponding to a set of performance features are received. The plurality of automated components is segmented into groups by applying a clustering algorithm to the plurality of automated components based on the segmentation feature values respectively associated therewith. For each group of automated components, a ranking of the automated components of the group is generated based at least on the set of performance feature values respectively associated therewith.

In a further example implementation, the plurality of automated components is segmented into groups by applying a K-means clustering algorithm to the plurality of automated components based on the segmentation feature values associated therewith. In accordance with this implementation, applying the K-means clustering algorithm includes initializing a set of cluster centroids used in applying the K-means clustering algorithm by applying a set of context rules to the plurality of automated components. Such an approach differs from a typical K-means clustering method in which the initial set of cluster centroids is selected at random.

In another example implementation, the performance of the automated components within each of the groups is ranked by determining a feature importance value for each of the performance features. The feature importance values are determined by training a machine learning (ML) based classification model to predict the groups segmented by applying the K-means clustering algorithm described above (or any other clustering algorithm suitable for segmenting automated components into groups). The training is performed based on the respective performance feature values of the automated components and the respective groups to which the automated components were assigned. For each of the automated components, a performance score for the automated component is calculated based on the performance feature values of the automated component and the feature importance values of each of the performance features. In an embodiment, the score for a particular entity is the weighted sumproduct of the performance feature values and the feature importance values as determined by the classification algorithm. For each group of automated components, a ranking of the automated components of the group is generated based on the respective performance scores.

Further features and advantages of the embodiments, as well as the structure and operation of various embodiments, are described in detail below with reference to the accompanying drawings. It is noted that the claimed subject matter is not limited to the specific examples described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 2 is a block diagram of a segmenting and evaluation component that may be used to identify and resolve performance issues of automated components, according to an example embodiment.

FIG. 3 is a flowchart of a process for identifying and resolving performance issues of automated components, according to an example embodiment.

FIG. 7 is a flowchart of a process for ranking a performance of automated components within groups of automated components.

FIG. 8 is a block diagram of a ranking component, according to an example embodiment.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
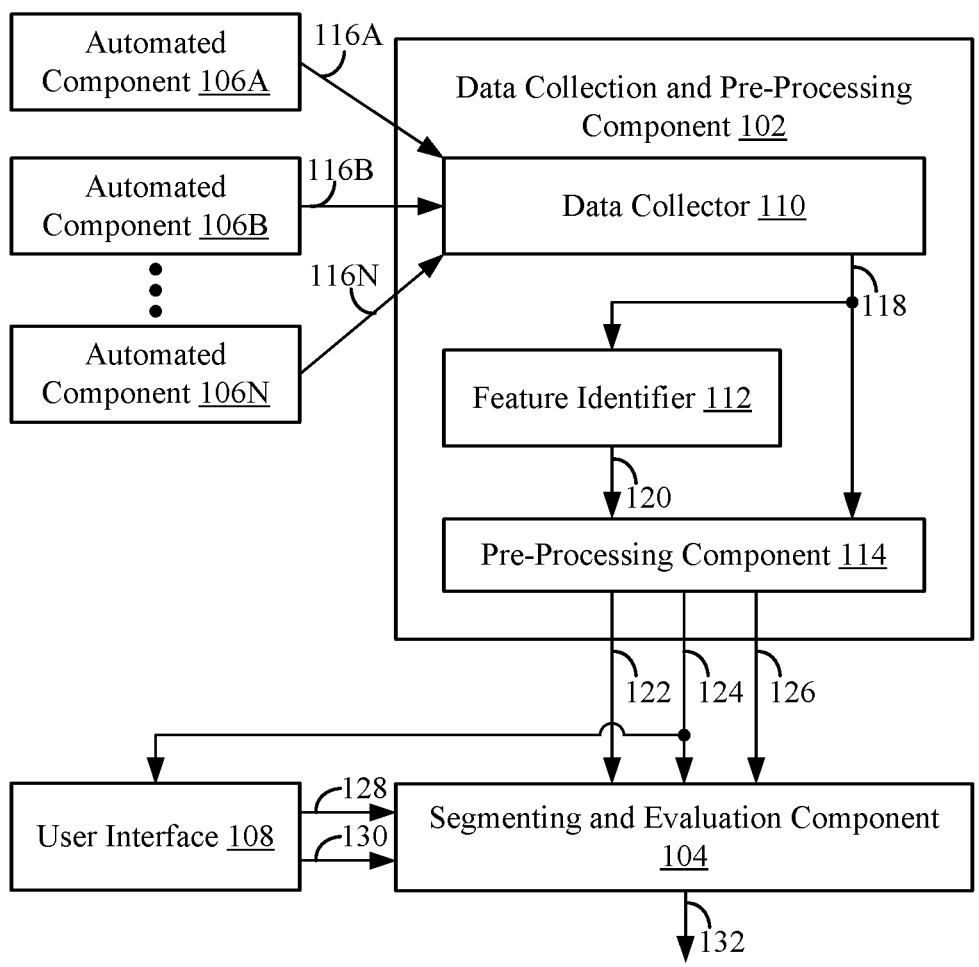
FIG. 1 is a block diagram of a system that may be used to identify and resolve performance issues of automated components, according to an example embodiment.

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Systems and Methods for Identifying and Resolving Performance Issues Cohort analytics may be performed to identify issues in an automated component's performance with respect to its cohort. An automated component may comprise a hardware component (e.g., a computing device in a data center or a network, or a component thereof), a software component (e.g., a resource meter in a cloud computing service, an application, an operating system, or a service), or any other type of automated component for which performance can be monitored and compared with similar automated components (e.g., a vehicle in a fleet of vehicles, a telecommunication device in a telecommunications network, a cooling device (e.g., a fan) in a data center).

As used herein, the term "cohort" refers to a group of automated components (e.g., a group of automated components segmented using a clustering algorithm, as described further below). Performance issues may be identified for a single automated component with respect to its cohort or across multiple (e.g., a portion of or all of) automated components in a cohort.

Various methods exist in cohort analytics for determining a cohort. For instance, expert-based and/or pairwise comparison-based methods may be used in multicriteria decision making processes to filter components based on similarities. However, these methods have difficulties in processing extensive amounts of data. In a machine learning (ML) context, a clustering algorithm may be used to group components into clusters. For example, a K-means clustering algorithm is a clustering algorithm that generates mathematically viable clusters from randomly selected initial cluster centroids. However, this clustering algorithm does not consider the context of the observations to be clustered, thus potentially leading to clusters that are irrelevant to an application. For instance, in the context of cohort analytics, resultant clusters may lead to inaccuracies in cohort groupings and analysis of components within a cohort.

In one aspect of the present disclosure, a system and method utilize data collected for automated components to segment the automated components into groups. In embodiments, the automated components are segmented into groups by applying a (e.g., supervised or unsupervised) clustering algorithm to the automated components. In a non-limiting example embodiment, a K-means clustering algorithm is applied to the automated components to segment the automated components into the groups. The application of the K-means clustering algorithm may include initializing a set of cluster centroids used in applying the K-means clustering algorithm by applying a set of context rules to the automated components. The set of context rules specify a non-random method for initially selecting the set of cluster centroids. In this way, systems and methods described herein have an increased chance to create groups based on the outcome of the K-means clustering algorithm that make logical sense for ranking performance of automated components, as described further below. In the described K-means clustering algorithm, the centers of the clusters are chosen based on the set of context rules that are tuned to the problem, as opposed to being chosen randomly.

The context rules may be based on segmentation features (e.g., location, type of automated component, type of storage or memory of an automated component, type of resources (e.g., computing devices, virtual machines, etc.) associated with an automated component, type of service performed by the automated component, etc.). For example, a context rule in accordance with an embodiment suggests grouping automated components based on geographic area and a type of service performed by the automated component. In an example embodiment, segmentation feature values are extracted from data collected for the automated components. Systems described herein leverage the segmentation features to select an initial set of cluster centroids to improve segmenting of the automated components into groups. Moreover, such systems may handle extensive sets of data from different dimensions across many automated components.

Once a cohort has been defined, components thereof may be evaluated with respect to various performance criteria; however, depending on the implementation, not all performance criteria may impact the performance of a component in the same way. In conventional approaches, all performance criteria or a subset of performance criteria is provided without considering the importance of each performance criteria.

In accordance with an embodiment, a single performance score for each automated component is calculated. To calculate the performance scores, he groups segmented at by the clustering algorithm described above (or segmented by another clustering algorithm suitable for segmenting automated components into groups) are used as target groups to train a classification model. This classification algorithm seeks to predict the cluster number based on the performance features. In an embodiment, the segmenting is based on the segmentation features and the groups are predicted using the performance features. The feature importance values of performance features of the automated components are determined by training a ML based classification model (e.g., a supervised learning classifier) based on respective performance feature values of the automated components and the groups to which such automated components have been assigned. Performance features may include, for example and without limitation, the occurrence, frequency or duration of outages or anomalies detected in the operation of an automated component, a measure of usage of an automated component, a measure of power consumed by an automated component, a measure of usage of a compute, network and/or storage resource used by an automated component, a measure of latency of an automated component, a measure of throughput of an automated component, and/or other measures of performance of an automated component, as described elsewhere herein and/or as would otherwise be understood by a person of skill in the relevant art(s) having benefit of this disclosure.

Systems described herein calculate a performance score for an automated component based on performance feature values of the automated component and the feature importance values of each performance feature. In an embodiment, the feature importance value of a performance feature determines the weight the associated performance feature value has on the performance score for the automated component. By training a machine learning based classification model to determine feature importance values for each performance feature, the informational value of the performance score for an automated component is enhanced by ensuring that performance features with relatively high importance contribute more to the performance score than features with relatively low importance. In accordance with an embodiment, a single performance score is determined for each of the automated components based on its performance feature values and the feature importance values. For instance, in a non-limiting example embodiment, a single score per automated component is calculated by the weighted sumproduct of the feature importance values and the performance feature values of the automated component. In an embodiment, automated components in a group are ranked with respect to each other based on respective performance scores.

Embodiments and techniques described herein group automated components and rank the performance of such components within these groups, thereby enabling an improved identification of performance issues of automated components by ranking performance with resp/ect to a group of properly identified peers. In this context, poorly performing components can be identified and mitigating actions can be taken to improve performance. For example, performance issues may be identified and/or resolved based on the rank of an automated component. Depending on the implementation, embodiments of the present disclosure may (e.g., automatically or semi-automatically) perform an action based on the rank of an automated component to resolve a performance issue and/or generate a command to an external system to resolve the performance issue. In an embodiment, characteristics (e.g., segmentation feature values and/or performance feature values) of one or more high ranked automated components may be compared to characteristics of one or more low ranked automated components to determine an action to improve performance of the low ranked automated component. For example, a system described herein may determine a performance target for one or more performance features of an automated component within a group based on highly ranked (e.g., top performing) automated components within a group and generate an alert that notifies a user of one or more areas for improving the performance of a low ranked (e.g., poorly performing) automated component.

Furthermore, embodiments and techniques described herein can improve the functioning of one or more computers. For instance, in an embodiment, a system segments computer hardware and/or software entities into groups. The system is configured to identify one or more poorly performing computer hardware and/or software entities within a group. The system is further configured to automatically perform one or more actions to improve the performance of the one or more identified poorly performing entities. In this way, systems and methods described herein may improve the functioning of one or more computers.

Identification and resolution of performance issues in automated components may be implemented in various manners, in embodiments. For example, FIG. 1 is a block diagram of a system 100 that may be used to identify and resolve performance issues of automated components, according to an example embodiment. Depending upon the implementation, system 100 may be implemented on a single computing device or across multiple computing devices. A non-limiting example of a computing device that may be used to implement system 100 will be described below in reference to FIG. 9.

As shown in FIG. 1, system 100 includes a data collection and pre-processing component 102, a segmenting and evaluation component 104, automated components 106A-106N (collectively referred to as "automated components 106" herein), and a user interface 108. Data collection and pre-processing component 102 is configured to collect data 116A-116N (collectively referred to as "data 116" herein) from or about respective automated components 106 and prepare the data for use by segmenting and evaluation component 104. As shown in FIG. 1, data collection and pre-processing component 102 includes data collector 110, feature identifier 112, and pre-processing component 114. Data collector 110 is configured to collect data 116 corresponding to automated components 106 and generate a set of collected data 118. In one embodiment, data 116 is stored in one or more databases. In this context, data collector 110 retrieves data 116 from the one or more databases to generate set of collected data 118. In another embodiment, data collector 110 includes a monitoring system configured to collect data 116 by monitoring automated components 106. In this context, data collector 110 may store data 116 in a database, not shown in FIG. 1, to generate set of collected data 118.

Feature identifier 112 is configured to receive set of collected data 118 and extract feature values 120 for each of automated components 106. As shown in FIG. 1, feature identifier 112 may receive set of collected data 118 from data collector 110; however, in some embodiments, feature identifier 112 may retrieve set of collected data 118 from a database, not shown in FIG. 1 for brevity. Feature values 120 may include values of segmentation features and/or values of performance features corresponding to respective ones of automated components 106. In accordance with an embodiment, feature identifier 112 is a ML model trained to identify feature values 120 from set of collected data 118. For instance, a ML model in accordance with an embodiment is configured to automatically extract segmentation features from set of collected data 118.

Pre-processing component 114 is configured to apply various pre-processing steps to set of collected data 118 and/or feature values 120. For instance, pre-processing component 114 may remove outliers from set of collected data 118 and/or feature values 120, encode features based on feature values 120, normalize data, and/or perform other pre-processing operations to prepare set of collected data 118 and/or feature values 120 for segmenting and evaluation by segmenting and evaluation component 104. For example, as shown in FIG. 1, pre-processing component 114 generates a plurality of automated components descriptors 122 representative of automated components 106, segmentation feature values 124, and performance feature values 126. Plurality of automated component descriptors 122 may include information respectively associated with automated components 106 such as identifiers, geographic addresses, device addresses, and/or other information for identifying and/or distinguishing each one of automated components 106. In an embodiment, pre-processing component 114 performs the pre-processing steps automatically. In an embodiment, pre-processing component 114 stores plurality of automated component descriptors 122, segmentation feature values 124, and/or performance feature values 126 in a database, not shown in FIG. 1 for brevity. For instance, pre-processing component 114 may store plurality of automated component descriptors 122, segmentation feature values 124, and/or performance feature values 126 in a database external to system 100, in a memory internal to a computing device implementing one or more components of system 100, or in a working memory of an application implementing a component of system 100.

Segmenting and evaluation component 104 is configured to identify and resolve performance issues with respect to automated components 106. For instance, as will be discussed below in reference to FIG. 2, segmenting and evaluation component 104 may segment plurality of automated components 106 into groups by applying a clustering algorithm based on segmentation feature values 124, generate a ranking of the automated components for each group based at least on respective performance feature values 126, and/or perform an action 132 based on the rank of at least one automated component. Action 132 may include generating an alert, generating one or more proposed actions for resolving a performance issue associated with at least one of automated components 106, initiating one or more automated processes for resolving a performance issue associated with the at least one of automated components 106, and/or any other type of action associated with the identification of and/or resolution of performance issues of automated components. In a non-limiting example, automated components 106 are hardware and/or software components in a computing environment. In this context, action 132 may include modifying a configuration of at least one of automated components 106, updating and/or patching software and/or firmware, performing a code analysis operation with respect to one or more of automated components 106, performing a virus scanning operation with respect to one or more automated components 106, allocating one or more additional computing resources to at least one of automated components 106, performing a load balancing operation, and/or any other type of action associated with the identification of and/or resolution of performance issues of hardware and/or software components in a computing environment. In accordance with an embodiment, system 100 may be configured to perform any of the actions described above or, alternatively, may transmit a command to a system external to system 100 to perform the action. As shown in FIG. 1, segmenting and evaluation component 104 receives automated component descriptors 122, segmentation feature values 124, and performance feature values 126 from pre-processing component 114. Alternatively, segmenting and evaluation component 104 may obtain one or more of automated component descriptors 122, segmentation feature values 124, and/or performance feature values 126 from a database not shown in FIG. 1 for brevity.

Figure 5:
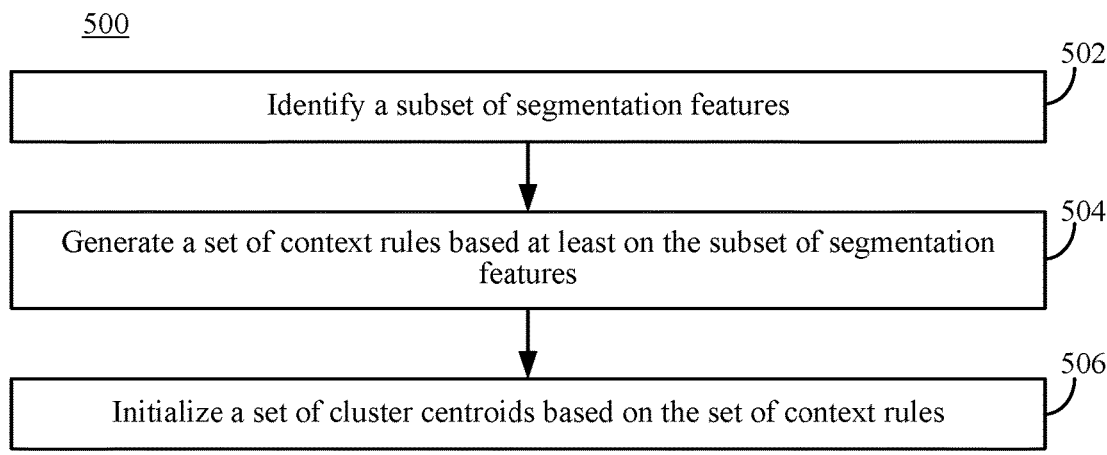
FIG. 5 is a flowchart of a process for initializing a set of cluster centroids, according to an example embodiment.

In accordance with an embodiment, and as will be discussed below in reference to FIG. 5, segmenting and evaluation component 104 is configured to apply a K-means clustering algorithm to group automated components 106, including initializing a set of cluster centroids based on context rules 128. Context rules 128 may include and/or be based on a subset of segmentation features corresponding to segmentation feature values 124. As shown in FIG. 1, segmenting and evaluation component 104 may receive context rules 128 as a form of user input from user interface 108; however, alternatively or additionally, one or more of context rules 128 may be predetermined and/or automatically determined (e.g., by pre-processing component 114 or by segmenting and evaluation component 104).

As shown in FIG. 1, system 100 may include a user interface 108 configured to enable a user to interact with segmenting and evaluation component 104. For instance, user interface 108 may enable a user to select one or more of context rules 128 to apply the clustering algorithm of segmenting and evaluation component 104. In an embodiment, user interface 108 receives segmentation feature values 124 and enables a user to select one or more of context rules 128 based on segmentation feature values 124. A user may utilize user interface 108 to otherwise transmit a user input 130 to segmenting and evaluation component 104 to modify an operation of segmenting and evaluation component 104. For instance, as will be discussed below in reference to FIG. 2, a user may transmit user input 130 to change the feature importance value for a given performance feature (e.g., from a positive value to a corresponding negative value).

Note that segmenting and evaluation component 104 may be implemented in various ways to perform its functions. For instance, FIG. 2 is a block diagram of a segmenting and evaluation component 200 that may be used to identify and resolve performance issues of automated components, according to an example embodiment. Segmenting and evaluation component 200 is a further embodiment of segmenting and evaluation component 104 of FIG. 1. Segmenting and evaluation component 200 is described below with respect to system 100 of FIG. 1. Further structural and operational examples will be apparent to persons skilled in the relevant art(s) based on the following descriptions.

Segmenting and evaluation component 200 may be implemented on a single computing device or across multiple computing devices. Segmenting and evaluation component 200 receives automated component descriptors 122, segment feature values 124, performance feature values 126, context rules 128, and user input 130. As shown in FIG. 2, segmenting and evaluation component 200 includes a clustering component 202, a ranking component 204, and a rank interpreter 206. Clustering component 202 is configured to segment plurality of automated components 106 into groups by applying a clustering algorithm (e.g., a K-means clustering algorithm) to plurality of automated components 106 based on segmentation feature values 124 respectively associated therewith. For instance, clustering component 202 generates groups of automated components 208 ("groups 208" hereafter). As will be discussed below with respect to FIGS. 4, 6A, and 6B, groups 208 may include a selected set of cluster centroids. Furthermore, an initial seed (e.g., an initial set of cluster centroids) may be selected for the clustering algorithm based on context rules 128.

Ranking component 204 is configured to, for each of groups 208, rank each automated component of the group based at least on performance feature values 126 respectively associated therewith. For instance, ranking component 204 generates a set of rankings 210 for the automated components of each of groups 208 based at least on performance feature values 126 respectively associated therewith. In embodiments, set of rankings 210 may include ranks for one of groups 208, respective ranks for each of groups 208, or respective ranks for a subset of groups 208. As will be discussed below with respect to FIGS. 7 and 8, a performance score may be calculated for each of the automated components. In this context, ranking component 204 is configured to generate set of rankings 210 based on the calculated performance scores. In an embodiment, the impact one or more performance feature values have on a performance score may be changed automatically (e.g., by ranking component 204) and/or manually (e.g., via user input 130).

Rank interpreter 206 is configured to perform action 132 based on the rank of at least one automated component. As discussed above, action 132 may include generating an alert, generating one or more proposed actions for resolving a performance issue associated with at least one of automated components 106, initiating one or more automated processes for resolving a performance issue associated with the at least one of automated components 106, and/or any other type of action associated with the identification of and/or resolution of performance issues of automated components. For instance, rank interpreter 206 may perform action 132 by transmitting an alert to user interface 108 of FIG. 1. In an embodiment, action 132 includes comparing at least one characteristic of one or more top ranked automated components with at least one characteristic of one or more bottom ranked automated components. In this way, characteristics contributing to improved performance of an automated component may be determined.

Segmenting and evaluation component 200 of FIG. 2 may operate in various ways, in embodiments. For instance, FIG. 3 is a flowchart 300 of a process for identifying and resolving performance issues of automated components, according to an example embodiment. In an embodiment, segmenting and evaluation component 200 may operate to perform one or all of the steps of flowchart 300. Flowchart 300 is described as follows with respect to system 100 of FIG. 1 and segmenting and evaluation component 200 of FIG. 2. Further structural and operational embodiments will be apparent to persons skilled in the relevant art(s) based on the following description. Note that not all steps of flowchart 300 need to be performed in all embodiments.

Flowchart 300 begins with step 302. In step 302, for each of a plurality of automated components, a respective set of segmentation feature values and a respective set of performance feature values are received. For instance, segmenting and evaluation component 200 of FIG. 2 is configured to receive segmentation feature values 124 and performance feature values 126 from pre-processing component 114 of FIG. 1 for each of automated components 106 (as described by automated component descriptors 122). In an embodiment, segmenting and evaluation component 200 may retrieve automated component descriptors 122, segmentation feature values 124 and/or performance feature values 126 from a database.

In step 304, the plurality of automated components is segmented into groups by applying a clustering algorithm to the plurality of automated components based on the segmentation feature values respectively associated therewith. For instance, clustering component 202 is configured to segment plurality of automated components 106 into groups 202 by applying a clustering algorithm to plurality of automated components 106 based on segmentation feature values 124. In an embodiment, the clustering algorithm is a K-means clustering algorithm. As will be discussed with respect to FIG. 5, clustering component 202 may select an initial set of cluster centroids based on context rules 128.

In step 306, for each group of automated components, a ranking of the automated components of the group is generated based at least on the set of performance feature values respectively associated therewith. For instance, ranking component 204 is configured to generate, for each of groups 208, set of rankings 210 based at least on performance feature values 126 respectively associated therewith. In embodiments, set of rankings 210 may include respective ranks for one of groups 208, a subset of groups 208, or all of groups 208.

In step 308, an action is performed based on the rank of at least one automated component. For instance, rank interpreter 206 is configured to perform action 132 based on at least one rank of set of rankings 210. As discussed above, action 132 may include generating an alert, generating one or more proposed actions for resolving a performance issue associated with at least one of automated components 106, initiating one or more automated processes for resolving a performance issue associated with the at least one of automated components 106, and/or any other type of action associated with the identification of and/or resolution of performance issues of automated components.

In an embodiment, a user may modify or control one or more steps, e.g., via user interface 108. For instance, a user may select a subset of segmentation features values 124 upon which the application of the clustering algorithm in step 304 will be based on. In another example, a user may select a subset of performance feature values 126 that will be used by ranking component 204 to generate set of rankings 210.

III. Example Systems and Methods for Clustering

A system and method described herein segments a plurality of automated components into groups by applying a clustering algorithm to the plurality of automated components based on segmentation feature values associated therewith. For example, clustering component 202 of FIG. 2 may implemented in various ways to apply a clustering algorithm to segment plurality of automated components 106. For instance, in an example embodiment, clustering component 202 is configured to apply a K-means clustering algorithm to segment plurality of automated components 106. In this example, the cluster centroids of the K-means clustering algorithm may be initialized based on context rules 128 of FIG. 1.

Figure 4:
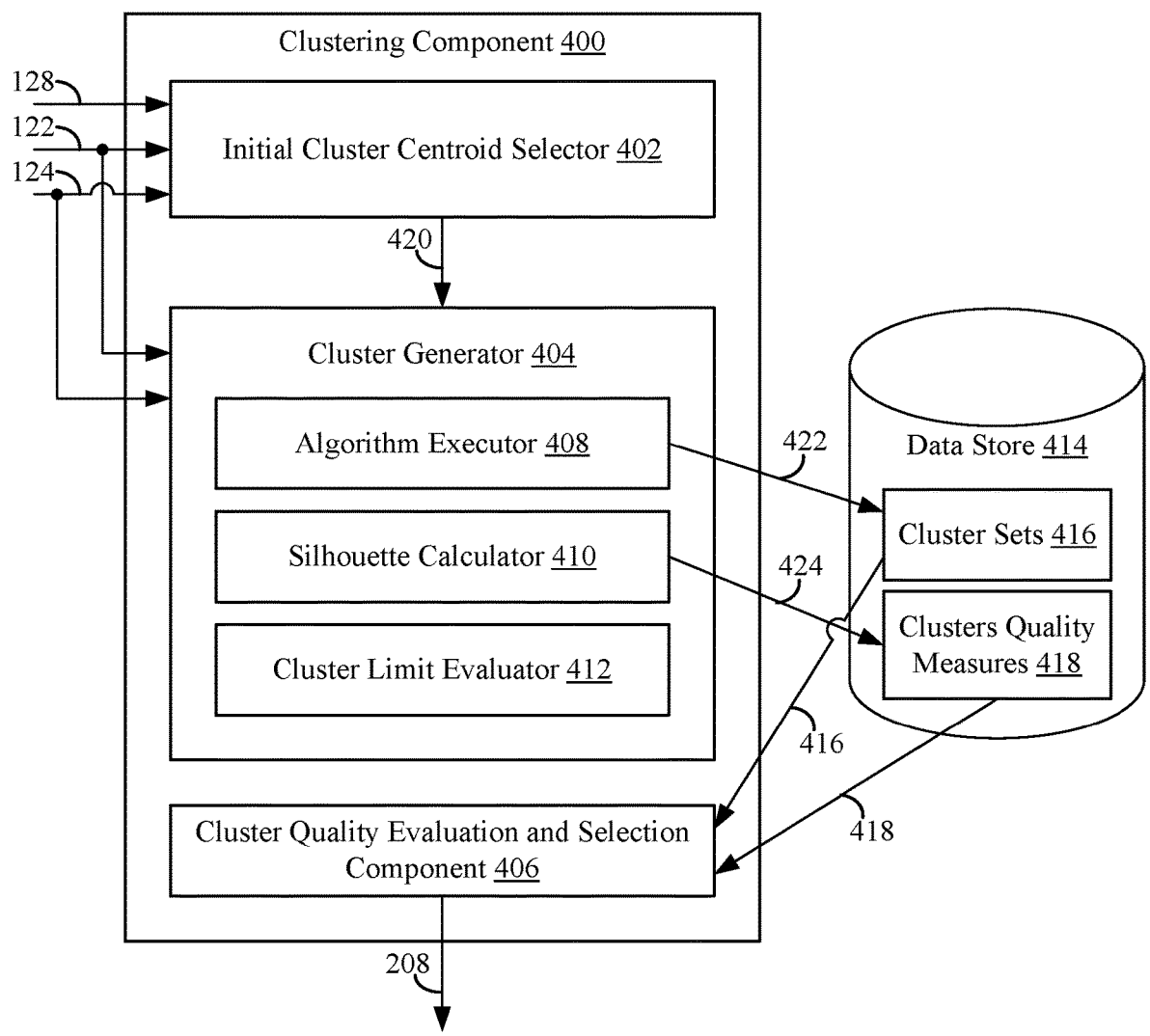
FIG. 4 is a block diagram of a clustering component, according to an example embodiment.

Clustering component 202 of FIG. 2 may be implemented in various ways to apply a K-means algorithm to a plurality of automated components. For instance, FIG. 4 is a block diagram of a clustering component 400, according to an example embodiment. Clustering component 400 is a further embodiment of clustering component 202 of FIG. 2. Clustering component 400 is described below with respect to system 100 of FIG. 1. Further structural and operational examples will be apparent to persons skilled in the relevant art(s) based on the following descriptions.

As shown in FIG. 4, clustering component 400 includes an initial cluster centroid selector 402, a cluster generator 404, and a cluster quality evaluation and selection component 406. Clustering component 400 may be configured to interface with a data store 414, in embodiments. Data store 414 may store cluster sets 416, clusters quality measures 418, and/or any other information associated with the operation of clustering component 400 described herein (e.g., data associated with an automated component, segmentation features, user preferences, previous cluster centroids, etc.). Data store 414 may be implemented on one or more memory devices (e.g., volatile or non-volatile memory devices) that are accessible to clustering component 400, and may be internal to or external to a computing device upon which clustering component 400 is executed. In accordance with an embodiment, cluster sets 416 and clusters quality measures 418 are stored in data store 414 as a data structure. The sub-components of clustering component 400 shown in FIG. 4 are described in further detail as follows.

Initial cluster centroid selector 402 is configured to select an initial set of cluster centroids 420. For instance, as shown in FIG. 4, initial cluster centroid selector receives automated component descriptors 122, segmentation feature values 124, and context rules 128. By using context rules 128 to select initial set of cluster centroids 420, initial cluster centroid selector 402 increases the chances that groups 208 generated by clustering component 400 make logical sense for ranking performance of automated components. In a non-limiting example, additional parameters or degrees of freedom are not introduced to initial cluster centroid selector 402 or later in the clustering process. In this context, the replicability of cluster assignments is improved, thereby reducing variance over different runs of clustering component 400 without introducing additional parameters to the clustering process.

Cluster generator 404 is configured to generate a set of clusters 422 and a clusters quality measure 424. As shown in FIG. 4, cluster generator 404 includes an algorithm executor 408, a silhouette calculator 410, and a cluster limit evaluator 412. Algorithm executor 408 is configured to apply a clustering algorithm (e.g., a K-means clustering algorithm) starting with initial set of cluster centroids 420. For instance, in accordance with an embodiment that will be discussed below with respect to FIG. 6A, algorithm executor 408 is configured to apply a K-means clustering algorithm to determine a set of clusters that meet convergence criteria. For example, in the context of K-means clustering algorithms, the convergence criteria include a K-means cost function, which is a sum of distances from an automated component to its assigned cluster centroid. In this example, application executor 408 is configured to minimize the K-means cost function value to determine a suitable set of clusters 422. As shown in FIG. 4, algorithm executor 408 may store set of clusters 422 in data store 414 as cluster sets 416.

In embodiments, cluster generator 404 may be configured to generate multiple sets of clusters (e.g., via algorithm executor 408) corresponding to different numbers of clusters. In this case, the clusters quality for each of the different numbers of clusters is evaluated. However, the K-means cost function is impacted by the number of clusters. Generally, a higher number of clusters leads to a smaller K-means cost function value. For this reason, cluster generator 404 may be configured to use another measure to evaluate quality between different sets of clusters. For example, as shown in FIG. 4, cluster generator 404 includes silhouette calculator 410. Silhouette calculator 410 is configured to determine a clusters quality measure 424 by calculating a mean silhouette coefficient based on segmentation feature values 124 and set of clusters 422. In accordance with an embodiment, the calculation of a silhouette coefficient is based on a full pairwise distance matrix over all of the automated components. For example, and as will be discussed below with respect to FIG. 6A, silhouette calculator 410 calculates a silhouette score for each of the automated components by measuring how similar the automated component is to its assigned cluster compared to other clusters in set of clusters 422. In this context, a high value indicates that the automated component is well matched to its assigned cluster and a poor match to its neighboring clusters. The mean silhouette coefficient is calculated as an average of silhouette scores across plurality of automated components 106. As shown in FIG. 4, silhouette calculator generates clusters quality measure 424, which is representative of the calculated mean silhouette coefficient, and stores clusters quality measure 424 as part of clusters qualities measures 418 in data store 414.

As mentioned above, cluster generator 404 may iterate over different numbers of clusters. In this context, cluster limit evaluator 412 is configured to determine if cluster generator 404 has iterated over a range of numbers of cluster centroids. For example, and as will be discussed below with respect to FIG. 6B, algorithm executor 408 and silhouette calculator 410 may respectively generate set of clusters 422 and clusters quality measure 424 for each of a number of cluster centroids in a range. The initial number of cluster centroids may be predefined, determined automatically by system 100 of FIG. 1 (e.g., via pre-processing component 114), or selected by a user (e.g., via user interface 108). Furthermore, a predefined minimum number of cluster centroids may be defined based on a default number (e.g., e.g., two clusters), defined automatically by system 100, or defined by a user via user interface 108. For each iteration, cluster limit evaluator 412 determines if the number of cluster centroids in set of clusters 422 is equal to the predefined minimum number of cluster centroids. If so, cluster generator 404 completes the clustering process. Otherwise, cluster limit evaluator reduces the number of cluster centroids in set of clusters 422 by one, and algorithm executor 408 and silhouette calculator 410 repeat their respective processes with respect to the reduced number of cluster centroids. A non-limiting example of a process for reducing the number of cluster centroids in set of clusters 422 will be described below in reference to FIG. 6B.

Cluster quality evaluation and selection component 406 is configured to select the set of clusters from cluster sets 416 with the highest clusters quality measure. For instance, cluster quality evaluation and selection component 406 determines a maximum mean silhouette coefficient from among clusters quality measures 418 and selects the set of clusters of cluster sets 416 that corresponds to the maximum mean silhouette coefficient. As shown in FIG. 4, cluster quality evaluation and selection component 406 obtains (e.g., by retrieving) cluster sets 416 and clusters quality measures 418 from data store 414.

Initial set of cluster centroids 420 may be selected in various ways, in embodiments. For instance, FIG. 5 is a flowchart 500 of a process for initializing a set of cluster centroids, according to an example embodiment. In an embodiment, flowchart 500 is a subset of step 304 of FIG. 3. In an embodiment, initial cluster centroid selector 402 may operate to perform one or all of the steps of flowchart 500. Flowchart 500 is described as follows with respect to system 100 of FIG. 1 and clustering component 400 of FIG. 4. Further structural and operational embodiments will be apparent to persons skilled in the relevant art(s) based on the following description. Note that not all steps of flowchart 500 need to be performed in all embodiments.

Flowchart 500 begins with step 502. In step 502, a subset of segmentation features is identified. For instance, a subset of segmentation features may be identified from segmentation features corresponding to segmentation feature values 124. In embodiments, the subset of segmentation features may be identified by pre-processing component 114 of FIG. 1, may be identified by initial cluster centroid selector 402 of FIG. 4, may be selected by a user via user interface 108 of FIG. 1 (e.g., as user input), may be retrieved from a configuration file or the like via a component of system 100 (e.g., pre-processing component 114 or initial cluster centroid selector 402). Alternatively, a component of system 100 (e.g., user interface 108, pre-processing component 114, or initial cluster centroid selector 402) may be pre-programmed to use a particular subset of segmentation features.

In step 504, a set of context rules are generated based at least on the subset of segmentation features. For instance, context rules 128 are generated based at least on the subset of segmentation features identified in step 502. In embodiments, context rules 128 may be generated by user interface 108 (e.g., as user input), generated by pre-processing component 114, or generated by initial cluster centroid selector 402. In accordance with an embodiment, context rules 128 may be stored in a memory (e.g., as a configuration file).

In step 506, a set of cluster centroids is initialized based on the set of context rules.

For instance, initial cluster centroid selector 402 selects initial set of cluster centroids 420 based on context rules 128. In embodiments, initial cluster centroid selector 402 may receive context rules 128 from user interface 108 (e.g., as user input) or may retrieve context rules 128 from a configuration file or the like. Step 506 may include selecting a certain number of cluster centroids. The number of cluster centroids to be selected may be predefined for clustering component 400, automatically determined by a component of system 100 of FIG. 1 (e.g., pre-processing component 114), or indicated by a user (e.g., via user interface 108).

Figure 6A:
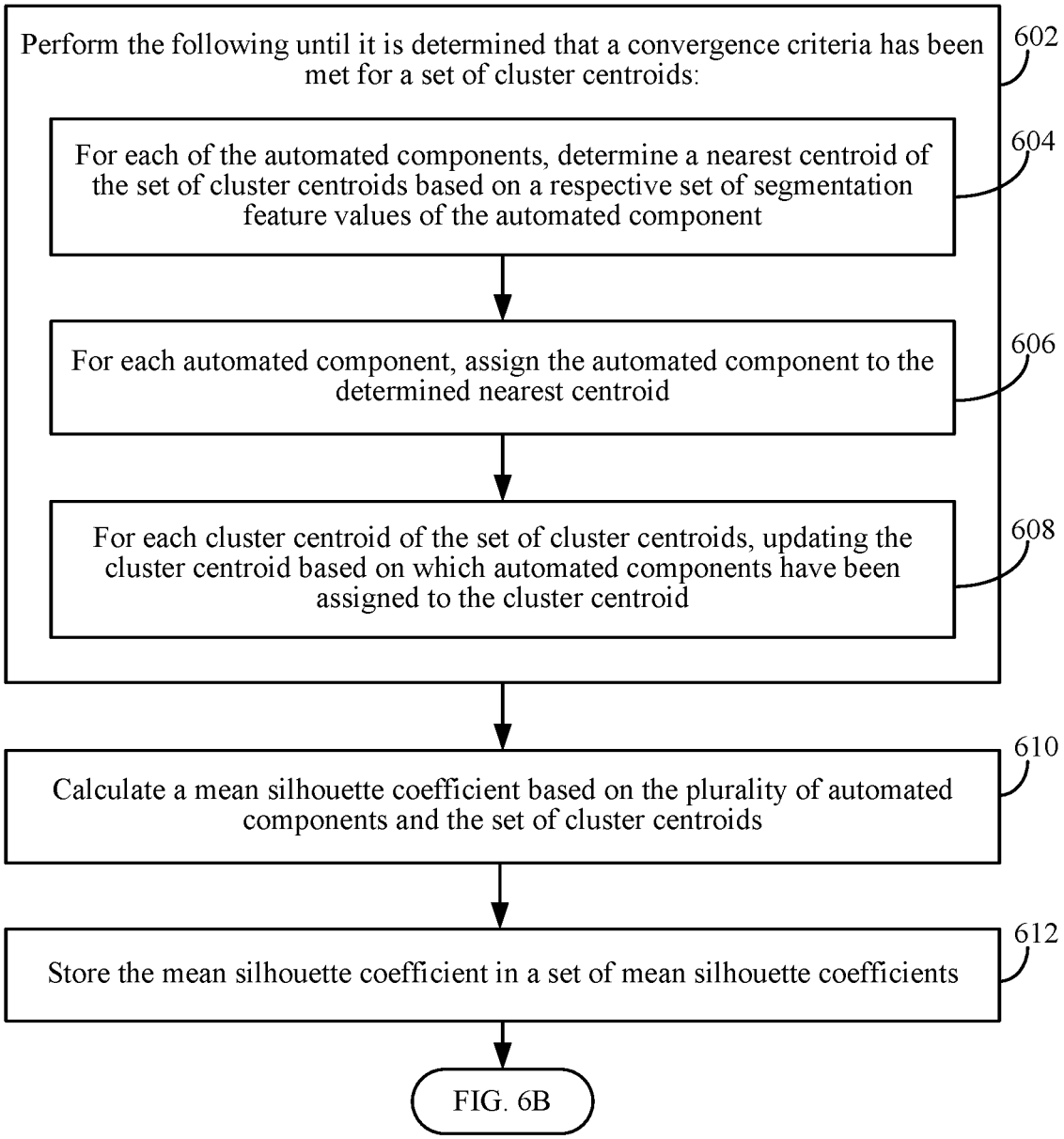
FIGS. 6A and 6B are flowcharts of a process for segmenting a plurality of automated components into groups, according to an example embodiment.
Figure 6B:
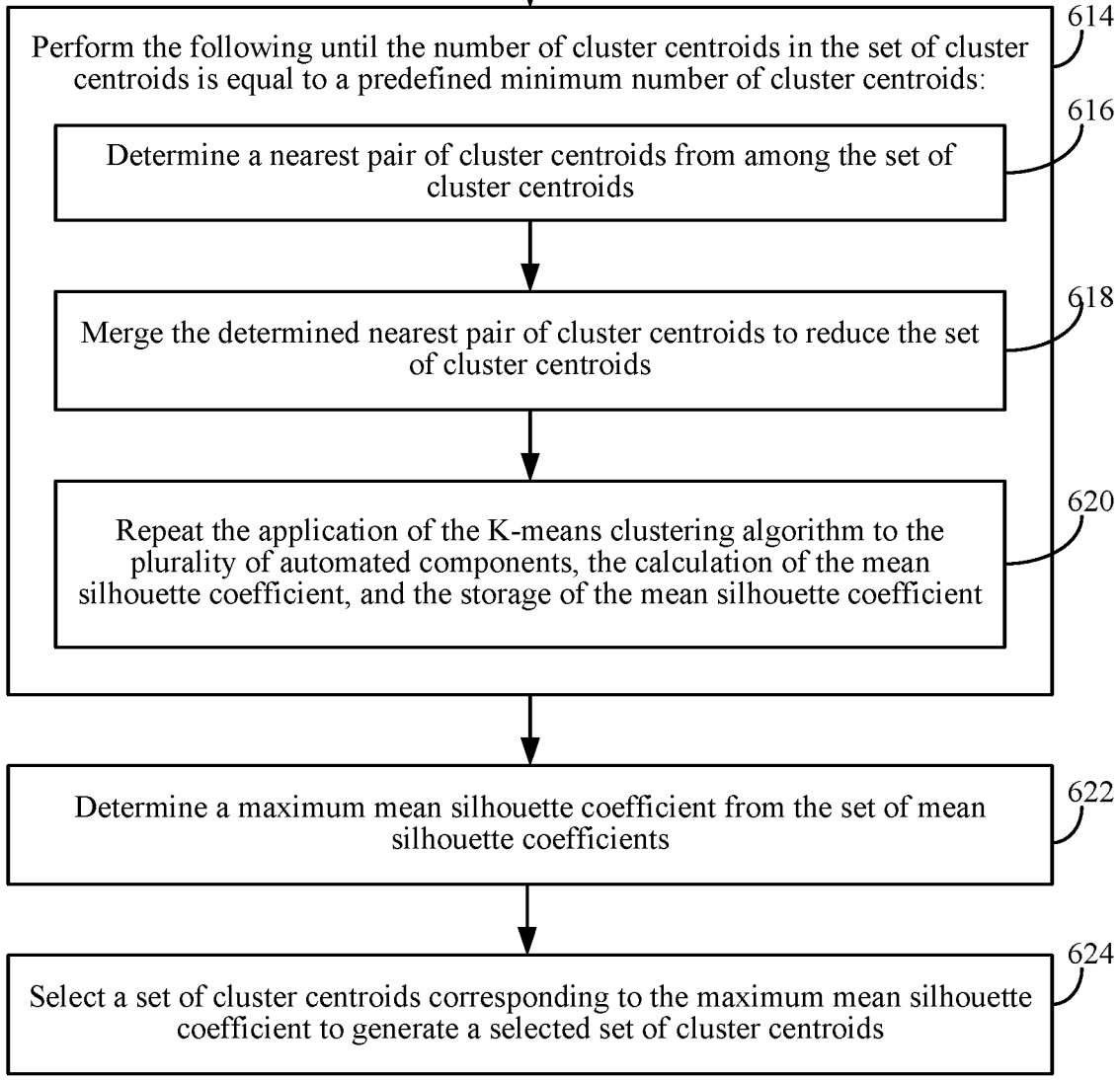

Groups 208 may be generated in various ways, in embodiments. For instance, FIGS. 6A and 6B are flowcharts of a process 600 for segmenting a plurality of automated components, according to an example embodiment. FIG. 6B is a continuation of FIG. 6A. In an embodiment, process 600 is a subset of step 304 of flowchart 300 of FIG. 3 and is performed subsequent to step 504 of flowchart 500 of FIG. 5. In an embodiment, cluster generator 404 and/or cluster quality evaluation and selection component 406 may operate to perform one or all of the steps of process 600. Process 600 is described as follows with respect to system 100 of FIG. 1 and clustering component 400 of FIG. 4. Further structural and operational embodiments will be apparent to persons skilled in the relevant art(s) based on the following description. Note that not all steps of process 600 need to be performed in all embodiments.

As shown in FIG. 6A, process 600 begins with step 602. In step 602, a K-means clustering algorithm is applied until it is determined if a convergence criteria has been met for a set of cluster centroids. For instance, algorithm executor 408 of FIG. 4 may apply a K-means clustering algorithm to plurality of automated components 106 until a convergence criteria is met. In accordance with an embodiment, the convergence criteria are met when a K-means cost function value is minimized. Step 602 is performed for a set of clusters based on initial set of cluster centroids 420. Step 602 comprises sub-steps 604, 606 and 608.

In sub-step 604, for each of the automated components, a nearest centroid of the set of cluster centroids is determined based on a respective set of segmentation feature values of the automated component. For instance, algorithm executor 408 of FIG. 4 is configured to, for each of plurality of automated components 106, determine a nearest centroid of initial set of cluster centroids 420 based on segmentation feature values 124 corresponding to the automated component.

In sub-step 606, for each of the automated components, the automated component is assigned to the determined nearest centroid. For instance, algorithm executor 408 of FIG. 4 is configured to, for each of plurality of automated components 106, assign the automated component to the nearest centroid determined in step 604.

In sub-step 608, for each cluster centroid of the set of cluster centroids, the cluster centroid is updated based on which automated components have been assigned to the cluster centroid. For instance, algorithm executor 408 of FIG. 4 is configured to, for each cluster centroid of initial set of cluster centroids 420, update the cluster centroid based on which automated components of plurality of automated components 106 have been assigned to the cluster centroid. In an embodiment, sub-steps 604, 606 and 608 are repeated until the convergence criteria for the set of cluster centroids is met, as described with respect to step 602 above. In an embodiment, algorithm executor 408 generates set of clusters 422, where set of clusters 422 is a set of clusters having cluster centroids that meet the convergence criteria. As described above with respect to FIG. 4, algorithm executor 408 may store set of clusters 422 in data store 414.

In step 610, a mean silhouette coefficient is calculated based on the plurality of automated components and the set of cluster centroids. For instance, silhouette calculator 410 of FIG. 4 calculates a mean silhouette coefficient based on segmentation feature values 124 of automated components 106 and set of clusters 422. In accordance with an embodiment, silhouette calculator 410 calculates a silhouette score for each of the automated components of plurality of automated components 106 by measuring how similar the automated component is to its assigned cluster compared to other clusters in set of clusters 422. Silhouette calculator 410 calculates the average of the silhouette scores across plurality of automated components 106 to determine the mean silhouette coefficient. In an embodiment, silhouette calculator 410 generates a clusters quality measure 424 based on the mean silhouette coefficient.

In step 612, the mean silhouette coefficient is stored in a set of mean silhouette coefficients. For instance, silhouette calculator 410 of FIG. 4 stores clusters quality measure 424 in clusters quality measures 418 of data store 414. In accordance with an embodiment, clusters quality measures 418 are keys of a data structure (e.g., a Python dictionary), each with a corresponding set of clusters of cluster sets 416 as values.

As shown in FIG. 6B, process 600 continues with step 614. In step 614, the number of cluster centroids in the set of cluster centroids is reduced and steps 602, 610 and 612 are repeated until the number of cluster centroids in the set of cluster centroids is equal to a predefined minimum number of cluster centroids. For instance, cluster limit evaluator 412 of FIG. 4 is configured to determine if the number of cluster centroids in set of clusters 422 is equal to a predefined minimum number of cluster centroids. If so, process 600 proceeds to step 622. Otherwise, cluster limit evaluator 412 reduces the number of cluster centroids in set of clusters 422 and process 600 performs steps 602, 610 and 612 with respect to the reduced set of clusters 422. In embodiments, the predefined minimum number of cluster centroids may be a default number (e.g., two clusters), a number determined automatically by system 100 (e.g., via pre-processing component 114 of FIG. 1), or a number defined by a user (e.g., via user interface 108). As shown in FIG. 6B, step 614 includes sub-steps 616, 618 and 620.

In sub-step 616, a nearest pair of cluster centroids is determined from among the set of cluster centroids. For instance, cluster limit evaluator 412 of FIG. 4 is configured to determine a nearest pair of cluster centroids from among set of clusters 422.

In sub-step 618, the determined nearest pair of cluster centroids is merged to reduce the set of cluster centroids. For instance, cluster limit evaluator 412 of FIG. 4 is configured to merge the nearest pair of cluster centroids determined in sub-step 616 to reduce the set of cluster centroids.

In sub-step 620, the application of the K-means clustering algorithm to the plurality of automated components, the calculation of the mean silhouette coefficient, and the storage of the mean silhouette coefficient are repeated. For instance, algorithm executor 408 of FIG. 4 is configured to receive the reduced set of cluster centroids generated in step 618 by cluster limit evaluator 412. In this context, algorithm executor 408 performs step 602 (including sub-steps 604, 606 and 608) with respect to the reduced set of cluster centroids. Furthermore, silhouette calculator 410 performs steps 610 and 612 with respect to the reduced set of cluster centroids. In an embodiment, step 614 (including sub-steps 616, 618 and 620) is repeated until the number of cluster centroids in set of clusters 422 is equal to a predefined minimum number of cluster centroids.

In step 622, a maximum mean silhouette coefficient is determined from the set of mean silhouette coefficients. For instance, cluster quality evaluation and selection component 406 of FIG. 4 is configured to obtain clusters quality measures 418 (e.g., from data store 414) and determine a maximum mean silhouette coefficient from among clusters quality measures 418.

In step 624, a set of cluster centroids corresponding to the maximum mean silhouette coefficient is selected to generate a selected set of cluster centroids. For instance, cluster quality evaluation and selection component 406 of FIG. 4 is configured to select a set of cluster centroids from cluster sets 416 corresponding to the maximum mean silhouette coefficient determined in step 624 to generate groups 208. In accordance with an embodiment, cluster sets 416 is a data structure indexed by corresponding clusters quality measures 418. For instance, a data structure (e.g., a Python dictionary) includes clusters quality measures 418 as keys, each with a corresponding set of clusters of cluster sets 416 as values.

As described herein, automated components may be segmented into groups by applying a clustering algorithm to the automated components based on the segmentation feature values respectively associated therewith. In an embodiment, automated components may be segmented into groups according to Algorithm 1 shown herein below:

Algorithm 1

Input:
E={$e_1, e_2 ... e_n$}
F={$f_1, f_2 ... f_m$}
B={$b_1, b_2 ... b_r$}
Output:
C={$c_1, c_2 ... c_k$}
procedure(E,B,F):
1: Initialize K cluster centroids μ={ $\mu c_1, \mu c_2 ... \mu c_k$}
2: clusters_quality ← empty dictionary Algorithm 1

3: while K ≠ 1 or the limit on K has not been met do
4: | while convergence criteria have not been met do
5: | | for each e ∈ E do
6: | | | find the nearest centroid $\mu c_i$ ∈ μ
7: | | | assign e to cluster $c_i$
8: | | end for
9: | | for each $c_i$ ∈ C do
10: | | | re-compute cluster centroid $\mu c_i$
11: | | end for
12: | end while
13: | $avg_{SC}$ ← Mean_Silhouette_Coefficient(C)
14: | clusters_quality[$avg_{SC}$] ← C
15: | merge the two clusters with the nearest centroids
16: | K ← K-1
17: | for each $c_j$ ∈ C do
18: | | initialize cluster centroid $\mu c_j$
19: | end for
20: end while
21: $max_{SC}$ = max(clusters_qualities.keys( ))
22: C = clusters_qualities[$max_{SC}$]
23: return C
end procedure Algorithm 1 is described with continued reference to clustering component 400 of FIG. 4, flowchart 500 of FIG. 5, and process 600 of FIGS. 6A and 6B. For Algorithm 1, E={$e_1, e_2 ... e_n$} is a set of n automated components (e.g., plurality of automated components 106, as described by automated component descriptors 122). Each automated component e∈E is represented by a respective F={$f_1, f_2 ... f_m$} and a respective P={$p_1, p_2 ... p_z$}∉F (as will be discussed below with respect to Algorithm 2), where F is a set of m segmentation feature values (e.g., segmentation feature values 124) and P is a set of z performance feature values (e.g., performance feature values 126). B={$b_1, b_2 ... b_r$} is a set of context rules (e.g. context rules 128).

K cluster centroids, μ={$\mu c_1, \mu c_2 ... \mu c_k$}, are initialized by applying B on E and considering (e.g., only) F (line 1 of Algorithm 1).

In line 2 of Algorithm 1, an empty dictionary clusters_quality is created.

Having initialized the set of cluster centroids at line 1 and created the clusters quality dictionary at line 2 of Algorithm 1, a K-means clustering algorithm is applied to E considering (e.g., only) F at lines 4-12 of Algorithm 1. Algorithm 1 loops while convergence criteria has not been met (e.g., a K-means cost function value is minimized) at lines 4-12.

In particular, Algorithm 1 loops for each of the automated components in E and assigns each automated component to a cluster $c_i$ at lines 5-8. In particular, the cluster centroid in μ nearest to an automated component is determined (e.g., based on segmentation feature values in F corresponding to the automated component) (line 6 of Algorithm 1) and the automated component is assigned to the cluster in clusters C={$c_1, c_2 ... c_k$} with the determined cluster centroid (line 7 of Algorithm 1).

Furthermore, Algorithm 1 loops for each cluster in C and re-computes the cluster centroids in μ at lines 9-11.

As discussed above with respect to silhouette calculator 410 of FIG. 4, since the K-means cost function is impacted by the number of clusters in C, an additional measure is used to evaluate quality of C. To determine quality of C, Algorithm 1 calculates and stores a mean silhouette coefficient for C at lines 13 and 14. In particular, a silhouette score is determined for each of the automated components in E and an average of values of silhouette scores across E (e.g., a mean silhouette coefficient) is calculated (line 13 of Algorithm 1). For instance, in an embodiment, the mean silhouette coefficient is calculated according to Equation 1 as follows:

$$\text{Mean\_Silhouette\_Coefficient}(C) = \frac{1}{n}\sum_{e \in E} sil(e) \quad \text{(Equation 1)}$$

In Equation 1, sil(e) is a silhouette score for an automated component e of E and n is the number of automated components in E. In line 13 of Algorithm 1, the mean silhouette coefficient of C is stored in a variable $\text{avg}_{SC}$.

Having calculated the mean silhouette coefficient at line 13 of Algorithm 1, the mean silhouette coefficient and C are stored in clusters_quality with $\text{avg}_{SC}$ as a key at line 14 of Algorithm 1.

As indicated in line 3, Algorithm 1 loops until K is equal to 1 or another limit (e.g., a predefined minimum number of cluster centroids as discussed above with respect to cluster limit evaluator 412 of FIG. 4 and step 614 of process 600 of FIG. 6B). To proceed to the next iteration of the loop in lines 3-20, Algorithm 1 reduces K.

In particular, the two clusters with the nearest centroids are merged (line 15 of Algorithm 1) and K is reduced by one (line 16 of Algorithm 1).

A loop for each cluster in C (lines 17-19 of Algorithm 1) is performed to initialize μ by calculating the means of assigned automated components of E (line 18 of Algorithm 18).

Having reduced K and initialized μ, Algorithm 1 repeats the loop at lines 3-20 until K is equal to 1 or meets its limit.

Upon completion of the loop at lines 3-20 of Algorithm 1, the clusters qualities are evaluated and a set of clusters is selected at lines 21-23 of Algorithm 1, as described as follows.

To determine which mean silhouette coefficient is highest, a maximum function is applied to the keys of the clusters_quality dictionary, the result of which is stored in a variable $\max_{SC}$ (line 21 of Algorithm 1). $\max_{SC}$ is used as a key to obtain the set of clusters with the maximum mean silhouette coefficient and store the set of clusters as C (line 22 of Algorithm 1).

Upon completion of Algorithm 1, process 600 of FIGS. 6A and 6B is likewise complete, and embodiments may utilize the set of clusters C returned by Algorithm 1 to evaluate and rank performance of automated components within a cluster.

IV. Example Systems and Methods for Ranking

A system and method described herein ranks automated components within a group based at least on the set of performance feature values respectively associated therewith. For example, ranking component 204 of FIG. 2 may be configured in various ways to rank automated components in groups 208. For instance, FIG. 7 is a flowchart 700 of a process for ranking a component, according to an example embodiment. Flowchart 700 is a further embodiment of step 306 of flowchart 300 of FIG. 3. In an embodiment, ranking component 204 may operate to perform one or all of the steps of flowchart 700. For purposes of illustration, flowchart 700 of FIG. 7 is described with respect to FIG. 8. FIG. 8 shows a block diagram of a ranking component 800, according to an example embodiment. Ranking component 800 is a further embodiment of ranking component 204 of FIG. 2. As shown in FIG. 8, ranking component 800 includes a machine learning based classification model 802 ("model 802" herein), a performance score calculator 804, and a rank generator 806. Flowchart 700 and ranking component 800 are described as follows. Note that the steps of flowchart 700 may be performed in an order different than shown in FIG. 7 in some embodiments. Furthermore, not all steps of flowchart 700 need to be performed in all embodiments. Further structural and operational embodiments will be apparent to persons skilled in the relevant art(s) based on the following description.

Flowchart 700 begins with step 702. In an embodiment, step 702 is performed subsequent to step 624 of process 600 of FIG. 6B. In step 702, a feature importance value is determined for each performance feature of a set of performance features by training a ML based classification model. The ML based classification model predicts a particular one of the groups based on the performance feature values of the automated components. For instance, model 802 is trained using performance feature values 126 of automated components 106 (as described by automated components descriptors 122) with groups 208 as target attributes. The training of model 802 generates feature importance values 808 for each performance feature of a set of performance features. Feature importance values 808 may be used to rank an automated component, to indicate the impact a performance feature has on an automated component's performance, to distinguish between automated component attributes in different groups of groups 208, to deal with correlated features, and/or to otherwise interpret and/or analyze performance of one or more automated components. As shown in FIG. 8, model 802 may be configured to receive user input 130. In accordance with an embodiment, user input 130 changes the feature importance value for a given performance feature (e.g., from a positive value to a corresponding negative value). Depending upon the implementation, model 802 may be a gradient boosting decision tree model, a regularized regression model, a random forest model, or other type of ML based classification model. As shown in FIG. 8, the feature importance values generated by training model 802 may be provided as an output of ranking component 800. For example, feature importance values 808 may be transmitted to user interface 108 of FIG. 1 to enable a user to review feature importance values 808 (e.g., for generating user input 130).

In step 704, for each of the automated components, a performance score is calculated for the automated component based on performance feature values of the automated component and the feature importance values of each of the performance features. For example, performance score calculator 804 is configured to calculate performance scores 810 for each of plurality of automated components 106 based on performance feature values 126 and feature importance values 808. In accordance with an embodiment, performance score calculator 804 calculates a performance score for an automated component by summing products of each performance feature value of the automated component and the respective feature importance value and dividing the result by a sum of the feature importance values.

In step 706, for each group of automated components, a ranking of automated components of the group is generated based on respective performance scores. For instance, rank generator 806 is configured to generate set of rankings 210 by, for each group, generating a ranking an automated component of the group based on respective performance scores 810. Set of rankings 210 may include ranks for each of plurality of automated components 106, for an automated component, for automated components of a group, and/or for automated components of a subset of groups 208.

As described herein, automated components may be ranked within a group based on performance feature values of the automated components and feature importance values of performance features. In an embodiment, automated components may be ranked according to Algorithm 2 shown herein below:

---
Algorithm 2
---
Input:
    E={$e_1, e_2 ... e_n$}
    C={$c_1, c_2 ... c_k$}
    P={$p_1, p_2 ... p_z$} ∉ F
Output:
    S={$s_1, s_2 ... s_n$}
    PI={$pi_1, pi_2 ... pi_z$}
procedure(E,C,P):
1:   PI ← Gradient_Boosting_Decision_Tree_Model
2:   for each e ∈ E do
3:   | calculate performance scores
4:   end for
5:   return S, PI
end procedure

---

Algorithm 2 is described with continued reference to flowchart 700 of FIG. 7 and ranking component of FIG. 8. As discussed above with respect to Algorithm 1, E is a set of n automated components (e.g., plurality of automated components 106), C is a set of K clusters, and P is a set of z performance feature values (e.g., performance feature values 126).

Feature importance values PI={$pi_1, pi_2 ... pi_z$} are calculated for each performance feature corresponding to respective performance feature values P (line 1 of Algorithm 1). In Algorithm 2, a gradient boosting decision tree model is trained to generate PI.

Having calculated PI, Algorithm 2 loops (lines 2-4) for each of the automated components of E and calculates a performance score s for the automated component at line 3 to generate a set of performance scores S={$s_1, s_2 ... s_n$}. For instance, in an embodiment, a performance score is calculated for an automated component according to Equation 2 as follows:

$$s = \frac{1}{\sum_{pi \in PI} pi} \sum_{j=1}^{z} e[p_j] * pi_j \qquad \text{(Equation 2)}$$

In Equation 2, s is calculated by summing products of each performance feature value of an automated component and the respective feature importance value and dividing the result by a sum of the feature importance values.

Upon completion of Algorithm 2, flowchart 700 of FIG. 7 is likewise complete, and embodiments may utilize feature importance values PI and/or performance scores S returned by Algorithm 2 to identify and/or resolve performance issues in automated components. For example, in accordance with an embodiment, a recommendation is made for an automated component based on the top performing automated components in the same cluster. In this context, the recommendation may include metrics for which the automated component is below/above an average value of all automated components in the cluster, below/above an average value of a subset (e.g., top performing) of automated components in the cluster, and/or other metrics associated with the performance of and/or ranking of the automated component.

V. Further Example Embodiments and Advantages

As noted above, systems and devices may be configured in various ways for identifying and resolving performance issues. Example embodiments have been described with respect to automated components, such as hardware components and software components; however, other types of automated components may be monitored and evaluated in order to identify and/or resolve performance issues. For example, system 100 may be configured to monitor automated components such as telecommunication devices in a telecommunication network, vehicles in a fleet of vehicles, cooling units in a data center, or the like, to identify and/or resolve performance issues in one or more of these automated components. Furthermore, embodiments and techniques described herein may be applied to business entities, including a partner, vendor, customer, or any other entity that takes an active part in a business and its performance can be evaluated over time. Furthermore, in an embodiment, a system or method described herein may be implemented in an analytic service such as a customer relationship management (CRM) tool (e.g., Microsoft Dynamics® application, a SAP® CRM application, Freshsales™ CRM software by Freshworks®, an Oracle® CRM application, etc.), an analytics service associated with a cloud computing service, a retail analytics software provided by a software vendor (e.g., Microsoft®, Oracle, NetSuite®, SAP, Celerant Technology, Epicor®, etc.), and/or the like.

Systems and methods described herein have been described with respect to a K-means clustering algorithm. In particular, embodiments enable the selection of an initial set of cluster centroids for a K-means clustering algorithm based on context rules. As described elsewhere herein, the context rules may be used to identify a subset of segmentation features to generate the initial set of cluster centroids. In this way, the chances that the groups that are created based on the outcome of the K-means clustering algorithm are ones that make logical sense for ranking performance of automated components. Furthermore, it is contemplated herein that a system may be configured to use a clustering algorithm other than K-means clustering algorithm (e.g., a hierarchical clustering algorithm, a database scan algorithm, or another type of algorithm suitable for segmenting the plurality of automated components into groups). In this context, context rules may be an input to initialize the clustering algorithm.

An embodiment described herein (e.g., as discussed above with respect to silhouette calculator 410 of FIG. 4 and process 600 of FIGS. 6A-6B) includes calculating a mean silhouette coefficient for iteratively smaller sets of cluster centroids down to a minimum set (e.g., based on a predefined minimum number of cluster centroids) and then selecting the set of cluster centroids with the best (e.g., highest) mean silhouette coefficient. In this way, a system in accordance with an embodiment selects a set of centroid clusters that provides good (e.g., the best) clustering while avoiding increasing the set of cluster centroids to an undesired degree in the name of obtaining good (e.g., the best) clustering. However, depending on the implementation, embodiments of the present disclosure may use another measure for improving the selection of a set of cluster centroids in addition to, or as an alternative to, the calculation of a mean silhouette coefficient.

Moreover, according to the described embodiments and techniques, any components of systems, data collection and pre-processing components, segmenting and evaluation components, clustering components, ranking components, rank interpreters, and/or user interfaces and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The further example embodiments and advantages described in this Section may be applicable to any embodiments disclosed in this Section or in any other Section of this disclosure.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

VI. Example Computer System Implementations

System 100, data collection and pre-processing component 102, segmenting and evaluation component 104, automated components 106, user interface 108, data collector 110, feature identifier 112, pre-processing component 114, segmenting and evaluation component 200, clustering component 202, ranking component 204, rank interpreter 206, flowchart 300, clustering component 400, initial cluster centroid selector 402, cluster generator 404, cluster quality evaluation and selection component 406, algorithm executor 408, silhouette calculator 410, cluster limit evaluator 412, data store 414, cluster sets 416, clusters quality measures 418, flowchart 500, process 600, flowchart 700, ranking component 800, model 802, performance score calculator 804, and/or rank generator 806 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
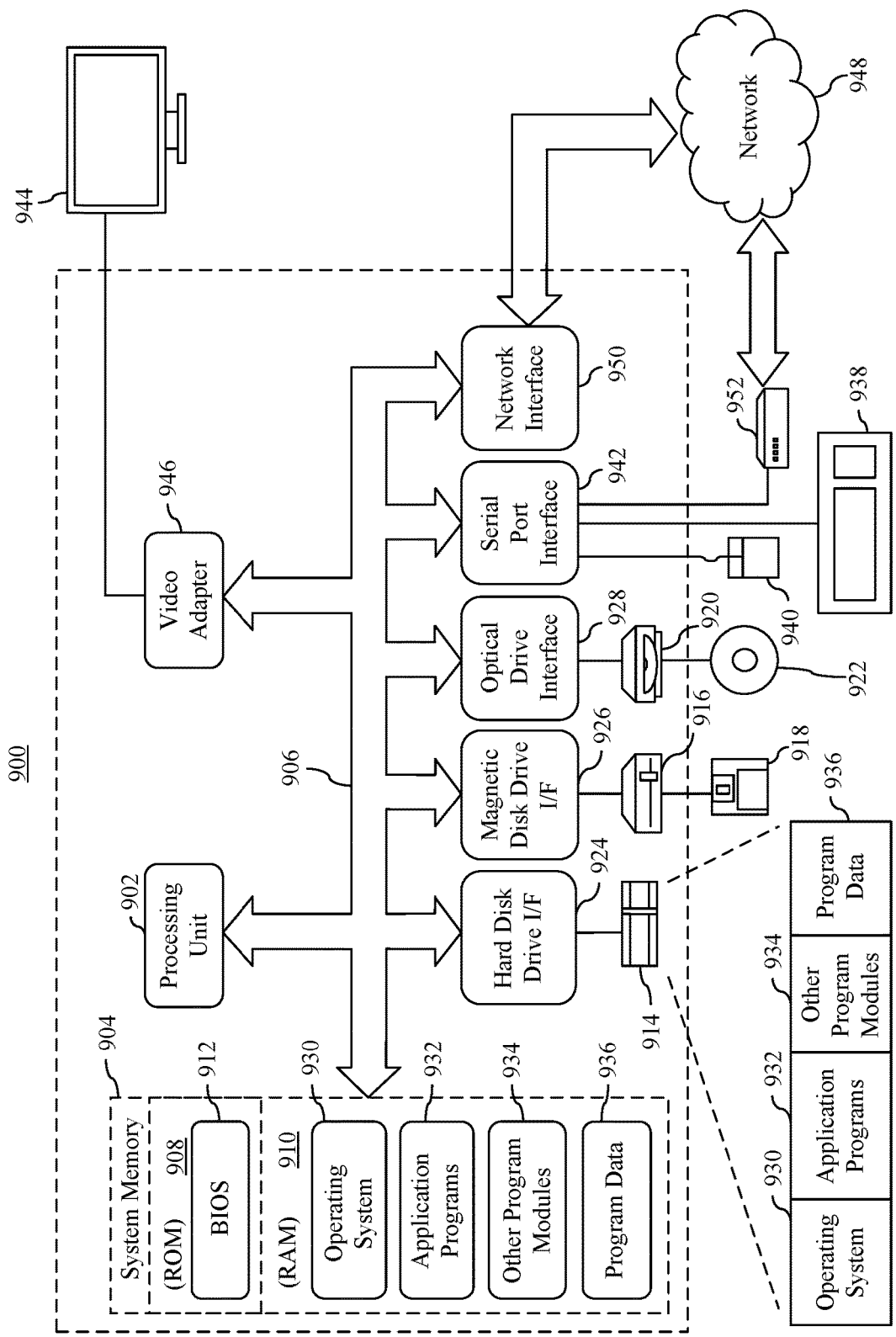
FIG. 9 is a block diagram of an example computer system that may be used to implement embodiments.

FIG. 9 depicts an exemplary implementation of a computer system 900 ("system 900" herein) in which embodiments may be implemented. For example, system 900 may be used to implement system 100, data collection and pre-processing component 102, segmenting and evaluation component 104, automated components 106, user interface 108, data collector 110, feature identifier 112, and/or pre-processing component 114, as described above in reference to FIG. 1. System 900 may also be used to implement segmenting and evaluation component 200, clustering component 202, ranking component 204, and/or rank interpreter 206, as described above in reference to FIG. 2. System 900 may also be used to implement clustering component 400, initial cluster centroid selector 402, cluster generator 404, cluster quality evaluation and selection component 406, algorithm executor 408, silhouette calculator 410, cluster limit evaluator 412, data store 414, cluster sets 416, clusters quality measures 418, as described above in reference to FIG. 4. System 900 may also be used to implement ranking component 800, model 802, performance score calculator 804, and/or rank generator, as described above in reference to FIG. 8. System 900 may also be used to implement any of the steps of any of the flowcharts of FIGS. 3, and/or 5-7, as described above. The description of system 900 provided herein is provided for purposes of illustration and is not intended to be limiting. Embodiments may be implemented in further types of computer systems, as would be known to persons skilled in the relevant art(s).

As shown in FIG. 9, system 900 includes one or more processors, referred to as processor unit 902, a system memory 904, and a bus 906 that couples various system components including system memory 904 to processor unit 902. Processor unit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor unit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random-access memory (RAM) 910. A basic input/output system 912 (BIOS) is stored in ROM 908.

System 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards and drives (e.g., solid state drives (SSDs)), digital video disks, RAMs, ROMs, and other hardware storage media.

A number of program modules or components may be stored on the hard disk, magnetic disk, optical disk, ROM, or RAM. These program modules include an operating system 930, one or more application programs 932, other program modules 934, and program data 936. In accordance with various embodiments, the program modules may include computer program logic that is executable by processing unit 902 to perform any or all the functions and features of data collection and pre-processing component 102, segmenting and evaluation component 104, automated components 106, user interface 108, data collector 110, feature identifier 112, pre-processing component 114, segmenting and evaluation component 200, clustering component 202, ranking component 204, rank interpreter 206, flowchart 300, clustering component 400, initial cluster centroid selector 402, cluster generator 404, cluster quality evaluation and selection component 406, algorithm applicator 408, silhouette calculator 410, cluster limit evaluator 412, flowchart 500, process 600, flowchart 700, ranking component 800, model 802, performance score calculator 804, and/or rank generator 806 (including any steps of flowcharts 300, 500, and/or 700, and/or process 600).

A user may enter commands and information into the system 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor unit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in, system 900. Display screen 944 may display information, as well as being a user interface for receiving user commands and/or other information (e.g., by touch, finger gestures, virtual keyboard, etc.). For example, display screen 944 may implement user interface 108 of FIG. 1 and be configured to display segmentation features and/or performance features, segmentation feature values 124, performance feature values 126, and/or context rules 128 of FIG. 1, groups 208 and/or set of rankings 210 of FIG. 2, feature importance values 808 and/or performance scores 810 of FIG. 8, and/or other information associated with identification and/or resolution of performance issues. In addition to display screen 944, system 900 may include other peripheral output devices (not shown) such as speakers and printers.

System 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable system 900 to implement features of embodiments described herein. Accordingly, such computer programs represent controllers of the system 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware. In accordance with various embodiments, the program modules may include computer program logic that is executable by processing unit 902 to perform any or all of the functions and features of data collection and pre-processing component 102, segmenting and evaluation component 104, automated components 106, user interface 108, data collector 110, feature identifier 112, and/or pre-processing component 114 as described above in reference to FIG. 1, segmenting and evaluation component 200, clustering component 202, ranking component 204, and/or rank interpreter 206 as described above in reference to FIG. 2, clustering component 400, initial cluster centroid selector 402, cluster generator 404, cluster quality evaluation and selection component 406, algorithm executor 408, silhouette calculator 410, cluster limit evaluator 412 as described above in reference to FIG. 4, ranking component 800, model 802, performance score calculator 804, and/or rank generator 806 as described above in reference to FIG. 8. The program modules may also include computer program logic that, when executed by processing unit 902, causes processing unit 902 to perform any of the steps of any of the flowcharts of FIGS. 3 and/or 5-7, as described above.

VII. Additional Exemplary Embodiments

In an embodiment, a system includes one or more processors and one or more memory devices. The one or more memory devices store program code to be executed by the one or more processors. The program code includes a clustering component and a ranking component. The clustering component is configured to, for each of a plurality of automated components, receive a respective set of segmentation feature values corresponding to a set of segmentation features and a respective set of performance feature values corresponding to a set of performance features. The clustering component is further configured to segment the plurality of automated components into groups by applying a K-means clustering algorithm to the plurality of automated components based on the segmentation feature values associated therewith. The clustering component is further configured to apply the K-means clustering algorithm by initializing a set of cluster centroids used in applying the K-means clustering algorithm. The initializing includes applying a set of context rules to the plurality of automated components. The ranking component is configured to rank a performance of the automated components within each of the groups by determining a feature importance value for each of the performance features. The ranking component is configured to determine the feature importance value for each of the performance features by training a machine learning based classification model that predicts a particular one of the groups based on the performance feature values of the automated components. For each of the automated components, the ranking component is configured to calculate a performance score for the automated component based on the performance feature values of the automated component and the feature importance values of each of the performance features. For each group of automated components, the ranking component is configured to generate a ranking of the automated components of the group based on the respective performance scores thereof In an embodiment, the clustering component is configured to initialize the set of cluster centroids used in applying the K-means clustering algorithm by identifying a subset of the segmentation features. The set of context rules are generated based at least on the subset of the segmentation features. The set of cluster centroids are initialized based on the set of context rules.

In an embodiment, the clustering component is configured to segment the plurality of automated components into groups by applying the K-means clustering algorithm by performing the following until it is determined that a convergence criteria has been met for the set of cluster centroids: for each of the automated components, determining a nearest centroid of the set of cluster centroids based on the respective set of segmentation feature values of the automated component, and assigning the automated component to the determined nearest centroid; and for each cluster centroid of the set of cluster centroids, updating the cluster centroid based on which automated components have been assigned to the cluster centroid. The clustering component is further configured to calculate a mean silhouette coefficient based on the plurality of automated components and the set of cluster centroids and store the mean silhouette coefficient in a set of mean silhouette coefficients. The clustering component is further configured to perform the following until the number of cluster centroids in the set of cluster centroids is equal to a predefined minimum number of cluster centroids: determining a nearest pair of cluster centroids from among the set of cluster centroids; merging the determined nearest pair of cluster centroids to reduce the set of cluster centroids; and repeating said applying the K-means clustering algorithm to the plurality of automated components, said calculating the mean silhouette coefficient, and said storing the mean silhouette coefficient. The clustering component is further configured to determine a maximum mean silhouette coefficient from the set of mean silhouette coefficients and select a set of cluster centroids corresponding to the maximum mean silhouette coefficient to generate a selected set of cluster centroids.

In an embodiment, the ranking component is configured to, for each of the automated components, calculate the performance score for the automated component by summing products of each performance feature value of the automated component and the respective feature importance value and dividing the result by a sum of the feature importance values.

In an embodiment, the program code further includes an interface. The interface is configured to enable a user to change the feature importance value for a given one of the performance features from a positive value to a corresponding negative value.

In an embodiment, the program code further includes a rank interpreter. The rank interpreter is configured to perform one or more of the following based on the rank of at least one of the automated components: generate an alert; generate one or more proposed actions for resolving a performance issue associated with the at least one of the automated components; or initiate one or more automated processes for resolving a performance issue associated with the at least one of the automated components.

In an embodiment, the plurality of automated components includes hardware or software components in a computing environment. The program code further includes a rank interpreter. The rank interpreter is configured to perform one or more of the following based on the rank of at least one of the automated components: modify a configuration of the at least one automated component; update or patch software or firmware; perform a code analysis operation; perform a virus scanning operation; allocate one or more additional computing resources to the at least one of the automated components; or perform a load balancing operation.

In an embodiment, the plurality of automated components includes resource meters of a cloud computing service, computing devices in a data center or a network, vehicles in a fleet of vehicles, telecommunication devices in a telecommunications network, or cooling devices in a data center.

In an embodiment, the machine learning based classification model is a gradient boosting decision tree model.

In an embodiment, a computer-implemented method for identifying and resolving performance issues of automated components is performed. The computer-implemented method includes, for each of a plurality of automated components, receiving a respective set of segmentation feature values corresponding to a set of segmentation features and a respective set of performance feature values corresponding to a set of performance features. The plurality of automated components is segmented into groups by applying a K-means clustering algorithm to the plurality of automated components based on the segmentation feature values associated therewith. A set of cluster centroids used in applying the K-means clustering algorithm are initialized by applying a set of context rules to the plurality of automated components. For each group of automated components, a ranking of the automated components of the group is generated based at least on the set of performance feature values respectively associated therewith.

In an embodiment, the set of cluster centroids used in applying the K-means clustering algorithm are initialized by identifying a subset of the segmentation features. The set of context rules are generated based at least on the subset of the segmentation features. The set of cluster centroids are initialized based on the set of context rules.

In an embodiment, the plurality of automated components are segmented into groups further by applying the K-means clustering algorithm, including performing the following until it is determined that a convergence criteria has been met for the set of cluster centroids: for each of the automated components, determining a nearest centroid of the set of cluster centroids based on the respective set of segmentation feature values of the automated component, and assigning the automated component to the determined nearest centroid; and for each cluster centroid of the set of cluster centroids, updating the cluster centroid based on which automated components have been assigned to the cluster centroid. A mean silhouette coefficient is calculated based on the plurality of automated components and the set of cluster centroids. The mean silhouette coefficient is stored in a set of mean silhouette coefficients. The following are performed until the number of cluster centroids in the set of cluster centroids is equal to a predefined minimum number of cluster centroids: determining a nearest pair of cluster centroids from among the set of cluster centroids; merging the determined nearest pair of cluster centroids to reduce the set of cluster centroids; and repeating the applying the K-means clustering algorithm to the plurality of automated components, the calculating the mean silhouette coefficient, and the storing the mean silhouette coefficient. A maximum mean silhouette coefficient is determined from the set of mean silhouette coefficients. A set of cluster centroids corresponding to the maximum mean silhouette coefficient is selected to generate a selected set of cluster centroids.

In an embodiment, the plurality of automated components includes resource meters of a cloud computing service, computing devices in a data center or a network, vehicles in a fleet of vehicles, telecommunication devices in a telecommunications network, or cooling devices in a data center.

In an embodiment, a computer-implemented method for identifying and resolving performance issues of automated components is performed. The computer-implemented method includes, for each of a plurality of automated components, receiving a respective set of segmentation feature values corresponding to a set of segmentation features and a respective set of performance feature values corresponding to a set of performance features. The plurality of automated components is segmented into groups by applying a clustering algorithm to the plurality of automated components based on the segmentation feature values respectively associated therewith. A performance of the automated components is ranked within each of the groups by determining a feature importance value for each of the performance features by training a machine learning based classification model that predicts a particular one of the groups based on the performance feature values of the automated components. For each of the automated components, a performance score for the automated component is calculated based on the performance feature values of the automated component and the feature importance values of each of the performance features. For each group of automated components, a ranking of the automated components of the group is generated based on the respective performance scores thereof In an embodiment, the performance score for the automated component is calculated by summing products of each performance feature value of the automated component and the respective feature importance value and dividing the result by a sum of the feature importance values.

In an embodiment, an interface is provided. The interface is configured to enable a user to change the feature importance value for a given one of the performance features from a positive value to a corresponding negative value.

In an embodiment, one or more of the following are performed based on the rank of at least one of the automated components: generating an alert; generating one or more proposed actions for resolving a performance issue associated with the at least one of the automated components; or initiating one or more automated processes for resolving a performance issue associated with the at least one of the automated components.

In an embodiment, the plurality of automated components includes hardware or software components in a computing environment. One or more of the following are performed based on the rank of at least one of the automated components: modifying a configuration of the at least one of the automated components; updating or patching software or firmware; performing a code analysis operation; performing a virus scanning operation; allocating one or more additional computing resources to the at least one of the automated components; or performing a load balancing operation.

In an embodiment, the plurality of automated components includes resource meters of a cloud computing service, computing devices in a data center or a network, vehicles in a fleet of vehicles, telecommunication devices in a telecommunications network, or cooling devices in a data center.

In an embodiment, the machine learning based classification model is a gradient boosting decision tree model.

VIII. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system, comprising:
one or more processors; and
one or more memory devices that store program code to be executed by the one or more processors, the program code comprising:
    a clustering component configured to:
        for each of a plurality of automated components, receive a respective set of segmentation feature values corresponding to a set of segmentation features; and
        segment the plurality of automated components into groups by applying a K-means clustering algorithm to the plurality of automated components based on the segmentation feature values associated therewith, wherein applying the K-means clustering algorithm comprises initializing a set of cluster centroids used in applying the K-means clustering algorithm by applying a set of context rules to the plurality of automated components;
    a ranking component configured to rank a performance of the automated components within each of the groups by:
        for each of the plurality of automated components, receive a respective set of performance feature values corresponding to a set of performance features;
        determining a feature importance value for each of the performance features by training a machine learning based classification model that predicts a particular one of the groups based on the performance feature values of the automated components;
        for each of the automated components, calculating a performance score for the automated component based on the performance feature values of the automated component and the feature importance values of each of the performance features; and
        for each group of automated components, generating a ranking of the automated components within the group based on the respective performance scores thereof, wherein each group of automated components comprises a respective high ranked automated component and a respective low ranked automated component;
a rank interpreter configured to, for a group of the groups:
determine a performance target for the respective low ranked automated component based on a comparison of respective performance feature values of a performance feature of the set of performance features of the respective high ranked automated component and the respective low ranked automated component, and
perform an action based on the determined performance target to improve the performance of the respective low ranked automated component.

2. The system of claim 1, wherein the clustering component is configured to initialize the set of cluster centroids used in applying the K-means clustering algorithm by:
identifying a subset of the segmentation features;
generating the set of context rules based at least on the subset of the segmentation features; and
initializing the set of cluster centroids based on the set of context rules.

3. The system of claim 1, wherein the clustering component is configured to segment the plurality of automated components into the groups by:
applying the K-means clustering algorithm by performing the following until it is determined that a convergence criteria has been met for the set of cluster centroids:
for each of the automated components:
determining a nearest centroid of the set of cluster centroids based on the respective set of segmentation feature values of the automated component; and
assigning the automated component to the determined nearest centroid; and
for each cluster centroid of the set of cluster centroids, updating the cluster centroid based on which automated components have been assigned to the cluster centroid;
calculating a mean silhouette coefficient based on the plurality of automated components and the set of cluster centroids;
storing the mean silhouette coefficient in a set of mean silhouette coefficients;
performing the following until the number of cluster centroids in the set of cluster centroids is equal to a predefined minimum number of cluster centroids:
determining a nearest pair of cluster centroids from among the set of cluster centroids;
merging the determined nearest pair of cluster centroids to reduce the set of cluster centroids; and
repeating said applying the K-means clustering algorithm to the plurality of automated components, said calculating the mean silhouette coefficient, and said storing the mean silhouette coefficient;
determining a maximum mean silhouette coefficient from the set of mean silhouette coefficients; and
selecting a set of cluster centroids corresponding to the maximum mean silhouette coefficient to generate a selected set of cluster centroids.

4. The system of claim 1, wherein the ranking component is configured to, for each of the automated components, calculate the performance score for the automated component by summing products of each performance feature value of the automated component and the respective feature importance value and dividing the result by a sum of the feature importance values.

5. The system of claim 4, wherein the program code further comprises an interface configured to enable a user to change the feature importance value for a given one of the performance features from a positive value to a corresponding negative value.

6. The system of claim 1, wherein to perform the action, the rank interpreter is further configured to perform at least one of the following:
generate an alert notifying an area for improving the performance of the respective low ranked automated component;
generate a proposed action for resolving a performance issue associated with the respective low ranked automated component; and
initiate an automated process for resolving a performance issue associated with the respective low ranked automated component.

7. The system of claim 1, wherein:
the plurality of automated components comprises hardware or software components in a computing environment; and
to perform the action, the rank interpreter is further configured to perform at least one of the following:
modify a configuration of the respective low ranked automated component;
update or patch software or firmware;
perform a code analysis operation;
perform a virus scanning operation;
allocate an additional computing resource to the respective low ranked automated component; or
perform a load balancing operation.

8. The system of claim 1, wherein the plurality of automated components include:
resource meters of a cloud computing service;
computing devices in a data center or a network;
vehicles in a fleet of vehicles;
telecommunication devices in a telecommunications network; or
cooling devices in a data center.

9. The system of claim 1, wherein the machine learning based classification model is a gradient boosting decision tree model.

10. A computer-implemented method for identifying and resolving performance issues of automated components, comprising:
for each of a plurality of automated components, receiving a respective set of segmentation feature values corresponding to a set of segmentation features and a respective set of performance feature values corresponding to a set of performance features;
segmenting the plurality of automated components into groups by applying a K-means clustering algorithm to the plurality of automated components based on the segmentation feature values associated therewith, wherein applying the K-means clustering algorithm comprises initializing a set of cluster centroids used in applying the K-means clustering algorithm by applying a set of context rules to the plurality of automated components;
for each group of automated components, generating a ranking of the automated components within the group based on the set of performance feature values respectively associated therewith, wherein each group of automated components comprises a respective high ranked automated component and a respective low ranked automated component; and for a group of the groups:

determining a performance target for the respective low ranked automated component based on a comparison of respective performance feature values of a performance feature of the set of performance features of the respective high ranked automated component and the respective low ranked automated component, and performing an action based on the determined performance target to improve the performance of the respective low ranked automated component.

11. The computer-implemented method of claim 10, wherein said initializing the set of cluster centroids used in applying the K-means clustering algorithm includes:

identifying a subset of the segmentation features;

generating the set of context rules based at least on the subset of the segmentation features; and initializing the set of cluster centroids based on the set of context rules.

12. The computer-implemented method of claim 10, wherein said segmenting the plurality of automated components into groups further comprises:

applying the K-means clustering algorithm by performing the following until it is determined that a convergence criteria has been met for the set of cluster centroids:

for each of the automated components:

determining a nearest centroid of the set of cluster centroids based on the respective set of segmentation feature values of the automated component; and assigning the automated component to the determined nearest centroid; and for each cluster centroid of the set of cluster centroids, updating the cluster centroid based on which automated components have been assigned to the cluster centroid;

calculating a mean silhouette coefficient based on the plurality of automated components and the set of cluster centroids;

storing the mean silhouette coefficient in a set of mean silhouette coefficients;

performing the following until the number of cluster centroids in the set of cluster centroids is equal to a predefined minimum number of cluster centroids:

determining a nearest pair of cluster centroids from among the set of cluster centroids;

merging the determined nearest pair of cluster centroids to reduce the set of cluster centroids; and repeating said applying the K-means clustering algorithm to the plurality of automated components, said calculating the mean silhouette coefficient, and said storing the mean silhouette coefficient;

determining a maximum mean silhouette coefficient from the set of mean silhouette coefficients; and selecting a set of cluster centroids corresponding to the maximum mean silhouette coefficient to generate a selected set of cluster centroids.

13. The computer-implemented method of claim 10, wherein the plurality of automated components include:

resource meters of a cloud computing service;

computing devices in a data center or a network;

vehicles in a fleet of vehicles;

telecommunication devices in a telecommunications network; or cooling devices in a data center.

14. A computer-implemented method for identifying and resolving performance issues of automated components, comprising:

for each of a plurality of automated components, receiving a respective set of segmentation feature values corresponding to a set of segmentation features and a respective set of performance feature values corresponding to a set of performance features;

segmenting the plurality of automated components into groups by applying a clustering algorithm to the plurality of automated components based on the segmentation feature values respectively associated therewith; and ranking a performance of the automated components within each of the groups by:

determining a feature importance value for each of the performance features by training a machine learning based classification model that predicts a particular one of the groups based on the performance feature values of the automated components;

for each of the automated components, calculating a performance score for the automated component based on the performance feature values of the automated component and the feature importance values of each of the performance features;

for each group of automated components, generating a ranking of the automated components within the group based on the respective performance scores thereof, wherein each group of automated components comprises a respective high ranked automated component and a respective low ranked automated component; and for a group of the groups:

determining a performance target for the respective low ranked automated component based on a comparison of respective performance feature values of a performance feature of the set of performance features of the respective high ranked automated component and the respective low ranked automated component, and performing an action based on the determined performance target to improve the performance of the respective low ranked automated component.

15. The computer-implemented method of claim 14, wherein said calculating the performance score for the automated component comprises summing products of each performance feature value of the automated component and the respective feature importance value and dividing the result by a sum of the feature importance values.

16. The computer-implemented method of claim 15, further comprising providing an interface that is configured to enable a user to change the feature importance value for a given one of the performance features from a positive value to a corresponding negative value.

17. The computer-implemented method of claim 14, wherein said performing an action comprises performing at least one of the following:

generating an alert notifying an area for improving the performance of the respective low ranked automated component;

generating a proposed action for resolving a performance issue associated with the respective low ranked automated component; and initiating an automated process for resolving a performance issue associated with the respective low ranked automated component.

18. The computer-implemented method of claim 14, wherein the plurality of automated components comprises hardware or software components in a computing environment, and said performing an action further comprises performing at least one of the following:
- modifying a configuration of the respective low ranked automated component;
- updating or patching software or firmware;
- performing a code analysis operation;
- performing a virus scanning operation;
- allocating one or more an additional computing resource to the respective low ranked automated component; or
- performing a load balancing operation.

19. The computer-implemented method of claim 14, wherein the plurality of automated components include:
- resource meters of a cloud computing service;
- computing devices in a data center or a network;
- vehicles in a fleet of vehicles;
- telecommunication devices in a telecommunications network; or
- cooling devices in a data center.

20. The computer-implemented method of claim 14, wherein the machine learning based classification model is a gradient boosting decision tree model.

\* \* \* \* \*